United States Patent
Persson

(12) 
(10) Patent No.: US 6,387,226 B1
(45) Date of Patent: May 14, 2002

(54) CORROSION PROTECTED TREATMENT DEVICE

(75) Inventor: Leif Persson, Åkersberga (SE)

(73) Assignee: Avonni AB, Djursholm (SE)

( * ) Notice: Subject to any disclaimer, the term of this patent is extended or adjusted under 35 U.S.C. 154(b) by 0 days.

(21) Appl. No.: 09/554,086

(22) PCT Filed: Dec. 8, 1998

(86) PCT No.: PCT/SE98/02240

§ 371 Date: May 22, 2000

§ 102(e) Date: May 22, 2000

(87) PCT Pub. No.: WO99/34032

PCT Pub. Date: Jul. 8, 1999

(30) Foreign Application Priority Data

Dec. 15, 1997 (SE) .............................................. 9704664

(51) Int. Cl.$^7$ ................................................ C23F 13/00
(52) U.S. Cl. .................. 204/196.01; 204/252; 204/264; 204/276
(58) Field of Search ............................ 204/196.01, 252, 204/264, 276; 205/753, 747, 751; 210/188, 435, 436, 437, 439, 446

(56) References Cited

U.S. PATENT DOCUMENTS 4,202,751 A    5/1980   Fukuzuka et al. .......... 204/197
4,376,753 A    3/1983   Lucas .......................... 376/305

FOREIGN PATENT DOCUMENTS

| EP | 0 273 508 | 7/1988 |
|---|---|---|
| EP | 0 324 440 | 7/1989 |
| GB | 1 232 334 | 5/1971 |
| JP | 8 176859 | 7/1996 |
| WO | 96/22407 | 7/1996 |
| WO | 97/10890 | 3/1997 |

*Primary Examiner*—Bruce F. Bell
(74) *Attorney, Agent, or Firm*—Jacobson Holman, PLLC

(57) ABSTRACT

A device for treating water that circulates in a closed conduit system, said device comprising a combination of a degasifier, on the one hand, and a corrosion inhibitor, on the other hand. The degasifier includes a tubular member (10) which is horizontal in its use position and which is intended to be connected in series with a conduit (13, 14) forming part of the conduit system. The tubular member is surrounded between its upstream and downstream ends (11, 12) by a housing (17) which includes an openable upper gas outlet (16). The tubular member communicates with the surrounding housing space through the medium of at least one aperture (15) provided therein. The corrosion inhibitor includes a sacrificial anode (20) which is positioned in the housing space outside the tubular member (10). The housing (17) also includes an openable bottom drain or outlet (28).

10 Claims, 3 Drawing Sheets

CORROSION PROTECTED TREATMENT DEVICE

BACKGROUND OF THE INVENTION

1. Field of the Invention

The present invention relates to a device for treating water which circulates in a closed conduit system, for instance in a central heating system.

2. Prior Art

It is known to degas or de-aerate liquid that circulates in a closed circuit, in order to inhibit corrosion and cavitation in pumps. An arrangement intended for this purpose is described, for instance, in EP-A-0 273 508. WO 97/10890 teaches a similar de-aerator arrangement connected in series and combined with an arrangement for separating solid particles from the circulating liquid. Cathodic devices are other forms of corrosion inhibiting means. For instance, U.S. Pat. No. 4,376,753 and WO 96/22407 teach the arrangement of electrolysis apparatus having consumable anodes connected in parallel conduits branching from the circulation system and particularly designed for this purpose. The arrangement can be controlled by regulating the flow of liquid passing through the parallel conduits and electrolysis apparatus, voltage selection across anode and cathode, selection of anode material and the optional addition of electrically conductive liquid, e.g. hydrazine. These corrosion inhibitors are, however, both sophisticated and expensive and are therefore inappropriate for use in central heating systems. There have also been suggested in the art corrosion inhibitors in the form of separate vessels that can be arranged in a parallel conduit or directly in the closed circuit, such that part of the liquid circulating in the circuit or all of said liquid will pass through said vessels, and which includes a sacrificial anode that functions in the absence of an applied voltage. Such inhibiting devices are commercially available under designations PROMAG® and ELYSATOR® respectively. The arrangement of a corrosion inhibiting device in a parallel conduit incurs extra installation costs and the requirement of more space, whereas the installation of a corrosion inhibiting device directly in a conduit in the closed circuit normally results in unacceptable erosion of the sacrificial anode, therewith greatly limiting the useful life span of said anode.

SUMMARY OF THE INVENTION

The present invention addresses the problem of providing a water treatment device that prevents corrosion both by de-aerating or degassing the circulating liquid and by processing the liquid electrolytically, and that is also essentially free from the drawbacks associated with known cathodic corrosion inhibitors previously mentioned.

With the intention of solving said problem, there is proposed in accordance with the invention a device of the kind defined in the introduction which is comprised of a degassifier and corrosion inhibitor combination, wherein the degassifier includes a tubular member which is horizontal in its use position and which is intended for connection in series with a conduit that forms part of the conduit system and which is surrounded between its upstream and downstream ends by an openable housing that includes an upper gas outlet, said tubular member communicating with the surrounding housing space via at least one opening provided therein, and wherein the corrosion inhibitor includes a sacrificial anode and is located in the housing space outside said tubular member, said housing also being provided with an openable bottom outlet.

The arrangement proposed in accordance with the invention provides, with the aid of simple means, an advantageous and effective water treatment device with which erosion of the sacrificial anode is very slight and with which said anode will dissolve essentially only at the rate covered by the occurring need of corrosion inhibiting. This combination of degasifier and corrosion inhibitor with sacrificial anode in one single component in accordance with the invention also affords important place-saving and simplified installation advantages.

It is an object of the invention that the anode is accommodated partially in a pipe-like member which projects out from the housing and which has an outer cover member.

Another object of the invention is that the pipe-like member extends downwardly from the housing in general, and in that the bottom drain or outlet is provided in the cover member.

A further object of the invention is that the sacrificial anode is carried by the cover member.

A still further object of the invention is that the sacrificial anode is supported electrically insulated from the cover member.

Another object of the invention is that the bottom outlet or the cover member includes a sludge outlet valve.

It is an object of the invention that either the upstream or downstream end of the tubular member is connected to a particle separator, and in that the degasifier and particle separator are housed in a common housing.

Another object of the invention is that the particle separator is connected to the upstream end of the tubular member.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

So that the invention will be more readily understood and further features thereof made apparent, the invention will now be described in more detail with reference to exemplifying embodiments thereof and also with reference to the accompanying drawings.

DESCRIPTION OF THE INVENTION

Figure 1:
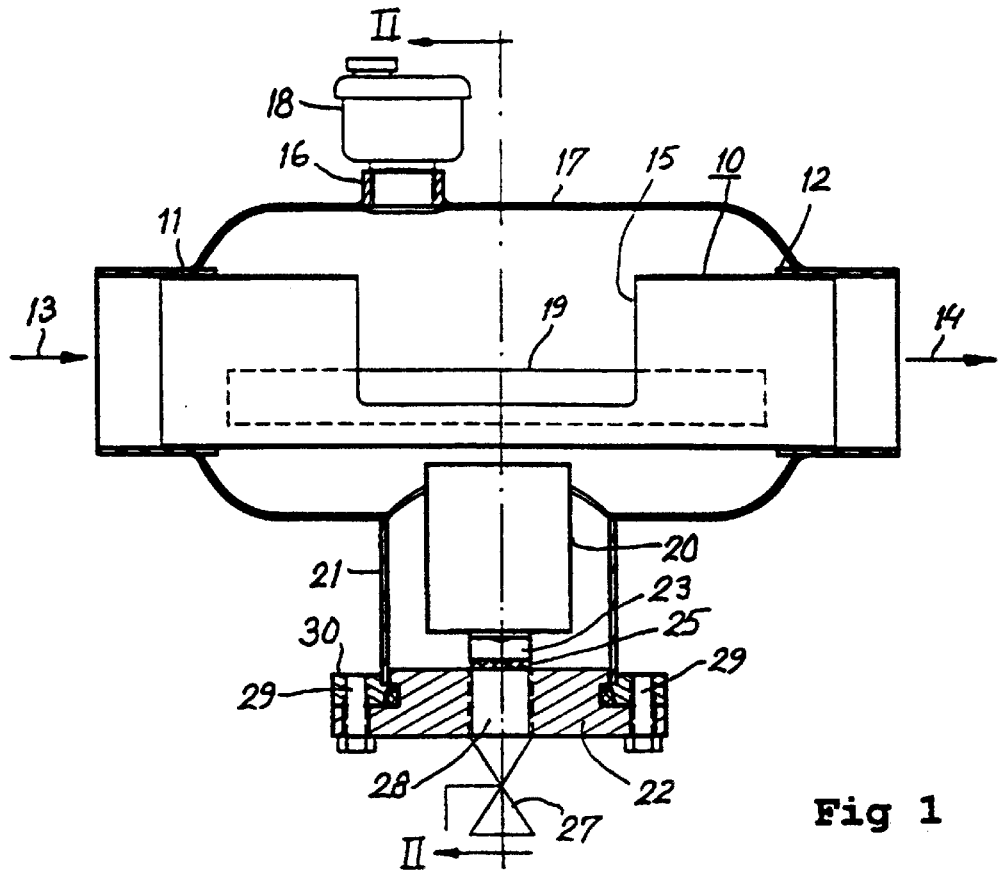
FIG. 1 is a vertical axial section view of a first embodiment of an inventive water treatment device.

Although only one preferred embodiment of the invention is explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Coinciding, or generally coinciding, features and components shown in the drawings have been identified with the same reference signs.

Figure 2:
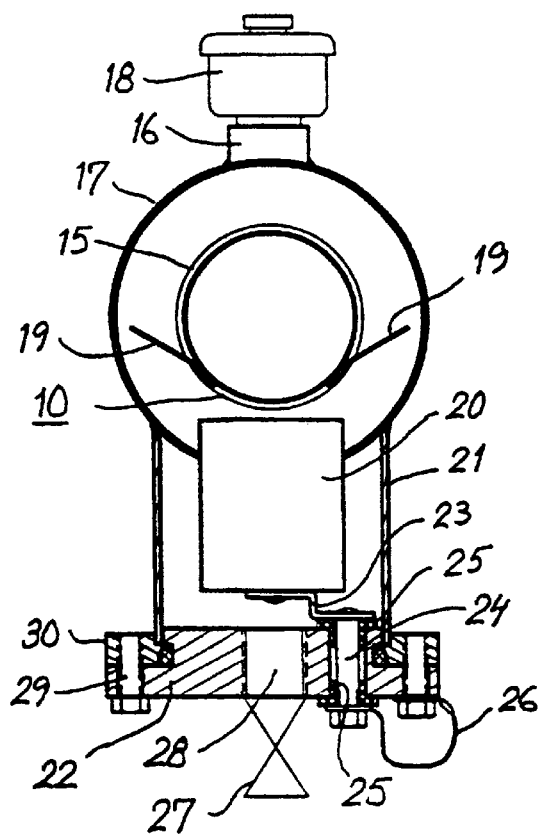
FIG. 2 is a cross-sectional view taken on the line II—II in FIG. 1.

The water treatment device illustrated in FIGS. 1 and 2 includes a tubular member 10 having inlet and outlet ends 11, 12 and intended for connection in series with a horizontal conduit represented by the arrows 13 and 14 and included in a closed conduit system, e.g. a central heating system. The tubular member 10 is provided between its ends 11, 12 with an interruption or an aperture 15 and is surrounded by a housing 17 that includes an upper gas outlet 16. The gas outlet 16 is equipped with a valve 18 which can be opened either manually or automatically to remove gas, e.g. air, that has collected in the upper cart of the housing 17.

The hitherto described water treatment device forms a gas separator for liquid circulating in the conduit system. As liquid passes through the gas separator, gas bubbles that accompany the liquid are able to depart from the tubular member 10 through the aperture 15 and thereafter collect in the upper part of the gas separator. Some of the liquid entering through the end 11 of the tubular member 10 is deflected out from the tubular member into the surrounding housing 17. This deflected liquid volume passes forwardly in the housing 17 at a reduced speed and thereafter downwardly around the downstream end 12 of said tubular member 10 and rearwardly beneath said tubular member and finally upwardly around the upstream end 11 of said tubular member, where said deflected liquid volume is entrained by the main flow passing directly through the tubular member. As illustrated, the arrangement may include wing-like members 19 that function to promote a desired flow pattern through the gas separator.

Degassing or de-aerating of circulating liquid in closed systems is beneficial, since the presence of gas, e.g. air, in systems that operate with water-carried heat can lower efficiency of the system and cause cavitations in circulation pumps. Oxygen concentrations in the liquid can also give rise to corrosion problems, which are reduced by degassing cr de-aerating the liquid. Additional protection against corrosion is achieved with the device illustrated in FIGS. 1 and 2, by placing a sacrificial anode 20 in he housing space externally of the tubular member 10, where the rate of liquid flow is greatly reduced and the erosion of the sacrificial anode caused by the liquid is correspondingly slight, said anode being comprised of magnesium, for instance.

In the illustrated case, the anode 20 is housed partially in a pipe-like connection piece 21 projecting out from the housing 17. The cuter end of the connection piece 21 is closed by an outer, removable lid or cover member 22 which supports the anode 20. FIGS. 1 and 2 show the anode 20 carried by a bracket 23 which is insulated electrically from the cover member, and a bolt 24 that passes through the cover member 22, said insulation being shown at 25. In operation, the anode 20 is connected conducively to the cover member 22 and to the conduit system in general by means of a cable shown at 26. A check to establish whether or not the anode has been consumed can be easily carried out, by breaking the connection (removing one end of the cable 26) and measuring the voltage between the bolt 24 and the cover member 22 insulated from said bolt, said bolt being connected conducively to the anode.

As the sacrificial anode 20 is consumed, sludge collects beneath the anode and drains-off through a bottom drain 28, which is preferably controlled by means of a valve 27. In the case of the illustrated water treatment device where the part 21 faces downwards, the bottom drain 28 is conveniently arranged in the cover member 22. Alternatively, the bottom drain 28 can be replaced by the removable cover member 22. The cover member 22 is conveniently fitted sealingly to a flange 30 on the outer end of the part 21, for instance by means of bolts 29, in the manner shown.

Figure 3:
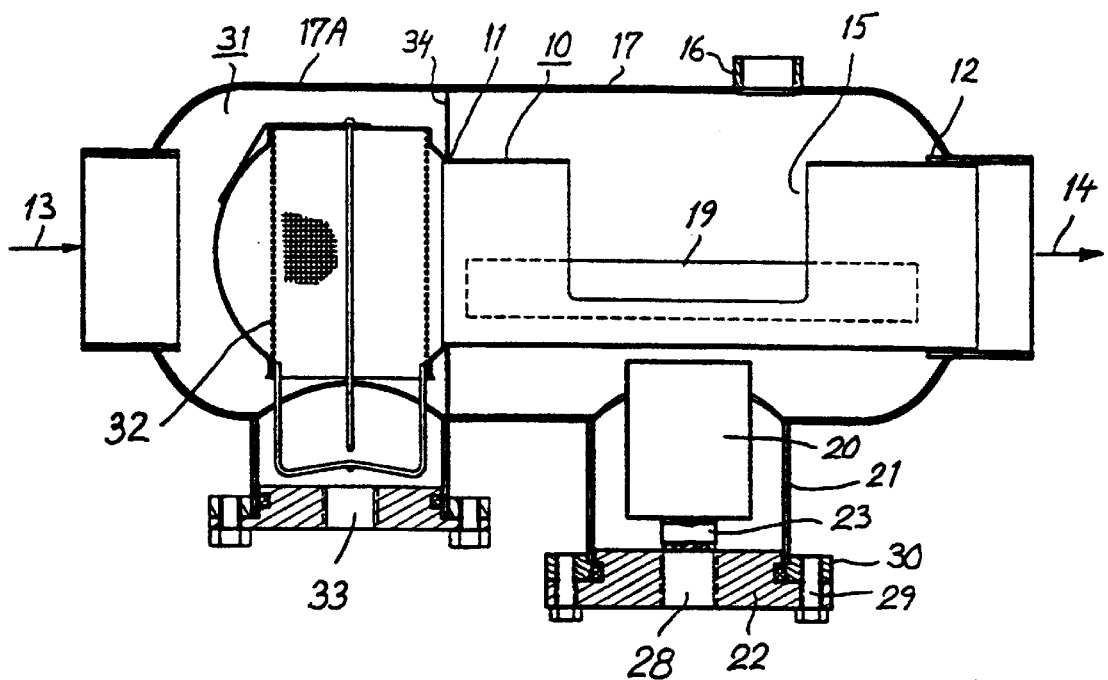
FIGS. 3–6 are views similar to the view of FIG. 1 and illustrate four further embodiments of the inventive device.
Figure 4:
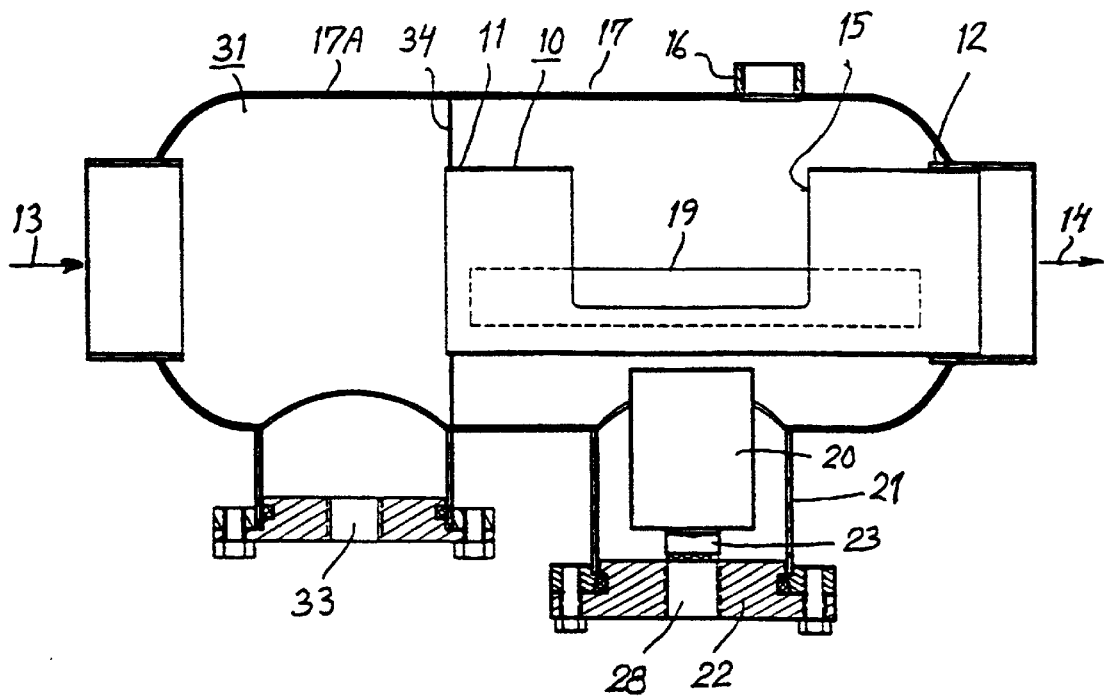
Figure 5:
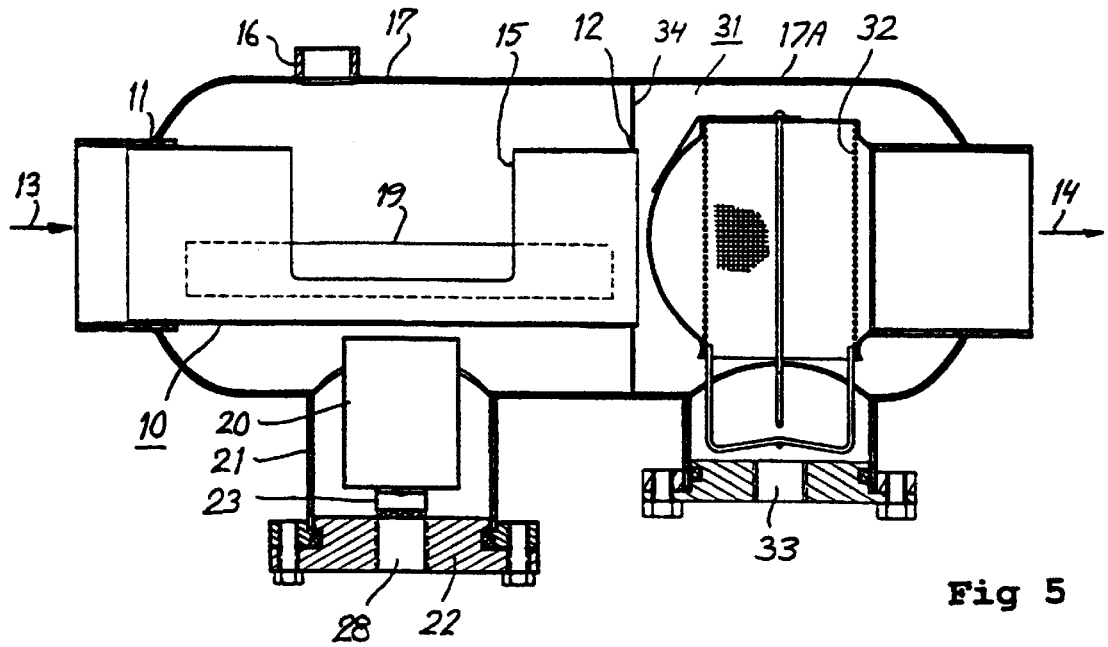
Figure 6:
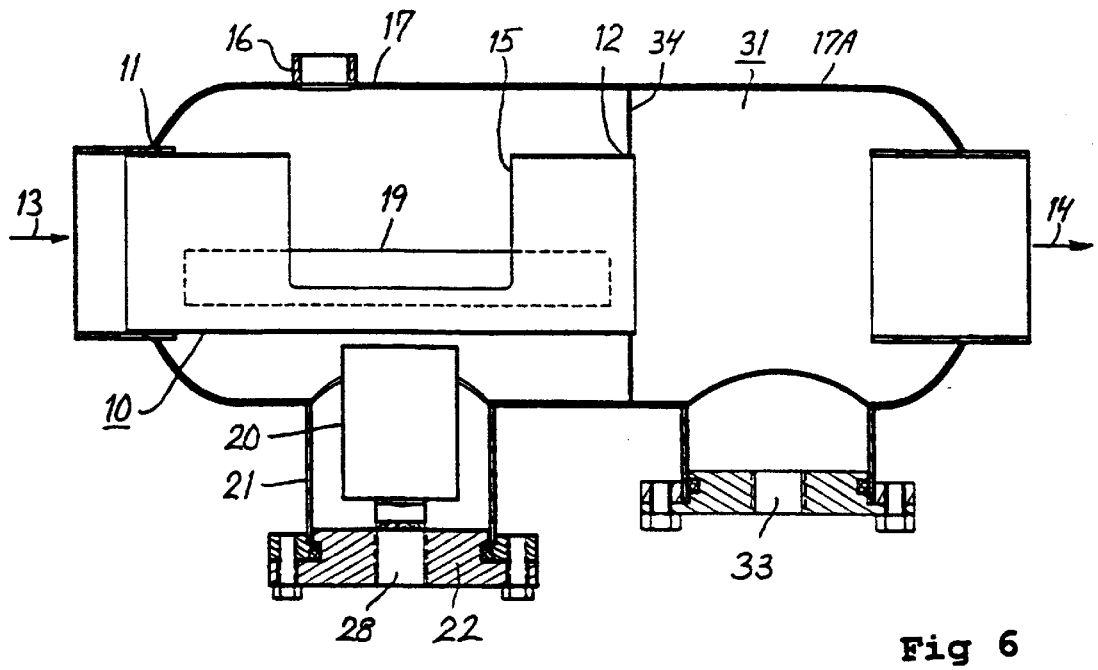

In the embodiment shown in FIG. 3, the water treatment device according to the invention is connected to a particle separator 31. This separator may include a filter or strainer 32, for instance of the kind illustrated and described in WO 97/10890, or may lack such a filter and therewith function to collect relatively course particles. The particle separator 31 of the embodiments illustrated in respective FIGS. 3–6 includes a housing 17A which forms an extension of the housing 17 and which includes its own bottom drain or cutlet 33. The housing components 17, 17A are separated from each other by a common partition wall 34. The particle separator 31 is conveniently disposed at the upstream end of the degasifier, as shown in FIGS. 3 and 4, although it may alternatively be disposed at the downstream end of said degasifier, in accordance with FIGS. 5 and 6. With regard to the remainder of the reference signs included in FIGS. 3–6, these signs have the same significance as that disclosed in the description of FIGS. 1 and 2.

It will be realized that the invention is not restricted to the afore described and illustrated exemplifying embodiments thereof and that the invention can be implemented in any desired manner within the scope of the inventive concept.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within. the scope of the invention.

What is claimed is:

1. A device for treating water circulating in a closed conduit system, comprising a degasifier and corrosion inhibitor combination, said degasifier including a tubular member extending horizontally and connected in series with a conduit having upstream and downstream ends surrounded by a housing that includes an openable upper gas outlet, said tubular member communicating with an interior of said housing through at least one aperture, the corrosion inhibitor including a sacrificial anode located in said housing and spaced externally of said tubular member, and said housing including an openable bottom outlet.

2. The device according to claim 1, wherein the anode is accommodated partially in a pipe member projecting out from the housing and said housing having an outer cover member.

3. The device according to claim 2, wherein the pipe member extends downwardly from the housing; and the bottom outlet is provided in said cover member.

4. The device according to claim 2, wherein the sacrificial anode is carried by the cover member.

5. The device according to claim 4, wherein the sacrificial anode is supported electrically insulated from said cover member.

6. The device according to claim 1, wherein the bottom outlet includes a sludge outlet valve.

7. The device according to claim 1, wherein the upstream end of the tubular member is connected to a particle separator, and in that the degasifier and particle separator are housed in a common housing.

8. The device according to claim 7, wherein the particle separator is connected to the upstream end of the tubular member.

9. The device according to claim 1, wherein the cover member includes a sludge outlet valve.

10. The device according to claim 1, wherein the downstream end of the tubular member is connected to a particle separator, and in that the degasifier and particle separator are housed in a common housing.

* * * * *